United States Patent Office 3,507,867
Patented Apr. 21, 1970

3,507,867
**2,3,4,6-TETRAHYDROPYRIMIDO[2,1-a]
ISOINDOL-6-ONE**
Theodore S. Sulkowski, Wayne, Pa., assignor to American Home Products Corporation, New York, N.Y., a corporation of Delaware
No Drawing. Continuation-in-part of application Ser. No. 622,930, Mar. 14, 1967. This application Sept. 5, 1968, Ser. No. 757,774
Int. Cl. C07d 51/46
U.S. Cl. 260—251
1 Claim

ABSTRACT OF THE DISCLOSURE

This invention is concerned with 2,3,4,6-tetrahydropyrimido[2,1-a]isoindol - 6 - one which is a useful intermediate for the preparation of tetrahydropyrimidoisoindolol compounds which are pharmacologically efficacious as antidepressants and diuretics. Further, this invention is concerned with the preparation of the subject compound by the condensation of phthalic anhydride and 1,3-diaminopropane.

---

This application is a continuation-in-part of the U.S. applications, Ser. No. 622,930, entitled "2,3,4,6-Tetrahydropyrimido[2,1-a]Isoindol-6-One," filed Mar. 14, 1967 and now abandoned; Ser. No. 576,833, entitled "2-(3-Aminopropyl)Isoindoles and Related Compounds," filed Sept. 2, 1966 and now abandoned; and Ser. No. 487,587, entitled "1,2,3,4,6,10b - Hexahydropyrimido[2,1-a]Isoindol-6-Ones and Related Compounds," filed Sept. 15, 1965 and abandoned.

This invention relates to a new and novel isoindolone as well as to the novel method for its preparation. In particular, the present invention is concerned with 2,3,4,6-tetrahydropyrimido[2,1-a]isoindol-6-one which is a useful intermediate in the synthesis of tetrahydropyrimidoisoindolol compounds which in standard and accepted pharmacological tests have demonstrated useful antidepressant and diuretic activity.

The new and novel compound of the present invention is prepared by the novel process of this invention which is depicted as follows:

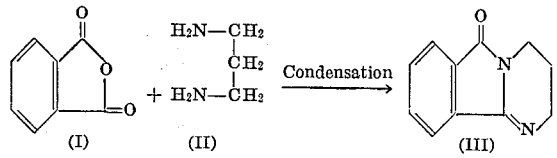

This condensation reaction is effected by admixing phthalic anhydride (I) with 1,3-diaminopropane (II) in a non-reactive, organic solvent at a temperature that is in the range of about 60° C. to about 140° C. for a period of from about ten to about forty-eight hours. Preferably this reaction is conducted, in an apparatus containing a water separator, at the reflux temperature of the reaction mixture for about eighteen hours.

When the condensation reaction is completed, the 2,3,4,6-tetrahydropyrimido[2,1-a]isoindol-6-one is separated by conventional recovery procedures. One such procedure is to extract the reaction mixture with an aqueous solution of a base, drying the organic phase by contact with a desiccant and, thereafter removing the non-reactive, organic solvent by evaporation. The residue may then be recrystallized from an appropriate solvent. In this regard, a mixture of miscible polar and non-polar organic solvents is particularly useful. Examples thereof are: acetone-alkane, ethylacetate-alkane, chloroform-alkane and ether alkane mixtures.

The phthalic anhydride (I) and 1,3-diaminopropane (II) reactants are commercially available and may also be easily prepared by well known chemical procedures. By non-reactive, organic solvent as employed herein is meant an organic solvent which dissolves the reactants but does not react with them under the above-described reaction conditions. Many such solvents will suggest themselves to those skilled in the art, in this regard, excellent results can be achieved employing toluene, benzene, xylene, chloroform, ether and carbon tetrachloride.

In accord with the present invention, 2,3,4,6-tetrahydropyrimido[2,1-a]isoindol-6-one (III) herein described has been found to be a valuable intermediate in a process for the synthesis of new and novel tetrahydropyrimidoisoindolol compounds. The process by which the compound (III) of the present invention is reacted with lithium compounds to prepare these tetrahydropyrimidoisoindol compounds is disclosed and claimed in copending U.S. patent application, Ser. No. 757,775 entitled "A Process for the Preparation of Tetrahydropyrimidoisoindolols," submitted for filing to the U.S. Patent Office on the same day as the subject application by Theodore S. Sulkowski, which is a continuation-in-part of U.S. patent applications, Ser. No. 723,587, entitled "Process for the Preparation of Tetrahydropyrimidinyl Phenyl Carbonyl Compounds" and still pending, filed Apr. 23, 1968; Ser. No. 622,929, entitled "Process for the Preparation of Tetrahydropyrimidinyl Phenyl Carbonyl Compounds," filed Mar. 14, 1967 and now abandoned; Ser. No. 576,833, entitled "2-(3-Aminopropyl)Isoindoles and Related Compounds," filed Sept. 2, 1966 and now abandoned; and Ser. No. 487,587, entitled "1,2,3,4,6,10b-Hexahydropyrimido[2,1-a]Isoindol-6-Ones and Related Compounds," filed Sept. 15, 1965 and now abandoned.

The tetrahydropyrimidoisoindolols prepared from the compound (III) of the present invention are described and claimed in copending United States Patent Application, Ser. No. 757,792, entitled "Tetrahydropyrimidinyl Phenyl Carbonyl Acid Addition Salts, Imidazolinyl Phenyl Carbonyl Acid Addition Salts and Related Compounds," submitted for filing to the United States Patent Office on the same day as the subject application, by Theodore S. Sulkowski, which is a continuation-in-part of United States patent applications, Ser. No. 622,918, entitled "Tetrahydropyrimidinyl Phenyl Carbonyl and Imidazonyl Phenyl Carbonyl Compounds," filed on Mar. 14, 1967 and now abandoned; Ser. No. 576,833, entitled "2-(3-Aminopropyl)Isoindoles and Related Compounds," filed Sept. 2, 1966 and now abandoned and Ser. No. 487,587, entitled "1,2,3,4,6,10b - Hexahydropyrimidol[2,1-a]Isoindol-6-Ones," filed Sept. 15, 1965 and now abandoned. In this copending and cofiled application, these tetrahydropyrimidoisoindolol compounds are described as useful antidepressant agents having mood elevating properties as psychic energizers when administered orally to mice by the procedure described by Rubin et al. in J.P.E.T. 120, 125 (1957) in the dosage range from about 1 to about 100 mg./kilo of animal body weight. Further, these tetrahydropyrimidoisoindolol compounds are also useful as diuretic agents when administered orally to rats by the procedure described by Lipschitz et al., in J. Pharmacol. 79, 97 (1943) in the dosage range from about 0.25 to about 25 mg./kilo of animal body weight.

When these tetrahydropyrimidoisoindolol compounds which arep repared from the compound of the present invention are employed as antidepressant and diuretic agents, they may be administered to warm-blooded animals, e.g., mice, rats, rabbits, dogs, cats, monkeys, etc. alone or in combination with pharmacologically acceptable carriers the proportion of which is determined by the solubility and chemical nature of the compounds, chosen route of administration and standard biological practice. For example, they may be administered orally in the form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of these tetrahydropyrimidoisoindolol compounds will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results causing any harmful or deleterious side effects.

The following examples are given by of illustration:

EXAMPLE I

Fifteen grams of phthalic anhydride in 150 ml. of toluene and 20 ml. of 1,3-diaminopropane are stirred and refluxed for eighteen hours in a flask equipped with a water separator. The reaction mixture is filtered while hot, then cooled and extracted with water and with a sodium carbonate solution. After drying over magnesium sulfate the organic portion is evaporated to dryness. On recrystallization of the residue from an acetone-hexane mixture there is obtained 2,3,4,6-tetrahydropyrimido[2,1-a]isoindol-6-one, M.P. 82–4° C.

*Analysis.*—Calc'd for $C_{11}H_{10}N_2O$ (percent): C, 70.95; H, 5.41; N, 15.04. Found (percent): C, 70.96; H, 5.41; N, 14.79.

In the same manner, the above reaction is repeated in xylene at 140° C. for a period of ten hours.

EXAMPLE II

Seven and a half grams of phthalic anhydride in 75 ml. of benzene and 10 ml. of 1,3-diaminopropane are stirred and heated at 60° C. for forty-eight hours in a flask equipped with a water separator. The mixture is filtered while hot, then cooled and extracted with water and with a potassium carbonate solution. After drying over magnesuim sulfate the organic portion is evaporated to dryness. On recrystallization of the residue from an ether-hexane mixture there is obtained 2,3,4,6-tetrahydropyrimido[2,1-a]isoindol-6-one.

Similarly, the above reaction is repeated in benzene at the reflux temperature of the reaction mixture for thirty hours.

EXAMPLE III

The procedure of Examples I and II is repeated in chloroform, ether and carbon tetrachloride at various temperatures for periods ranging from ten to forty-eight hours with similar results.

What is claimed is:

1. 2,3,4,6-tetrahydropyrimido[2,1-a]isoindol-6-one.

References Cited

FOREIGN PATENTS 730,692    5/1955    Great Britain.

ALTON D. ROLLINS, Primary Examiner

R. V. RUSH, Assistant Examiner

U.S. Cl. X.R.

424—251